United States Patent [19]
Renk et al.

[11] Patent Number: 5,676,221
[45] Date of Patent: Oct. 14, 1997

[54] GEAR CASE

[75] Inventors: Richard J. Renk; Richard M. Ebert, both of Winona, Minn.

[73] Assignees: Carol Ann Mackay; Helen Lou Kurtz, both of Winona, Minn.

[21] Appl. No.: 659,447

[22] Filed: Jun. 6, 1996

[51] Int. Cl.[6] .................................................. F01M 3/00
[52] U.S. Cl. ...................... 184/6.12; 74/467; 74/606 R; 74/609; 277/192; 277/12; 277/166
[58] Field of Search .................. 184/6.12; 74/606 R, 74/608, 609, 467; 277/12, 166, 192

[56] References Cited

U.S. PATENT DOCUMENTS

| | | | |
|---|---|---|---|
| 4,347,759 | 9/1982 | Renk et al. | 74/606 R |
| 4,470,324 | 9/1984 | Renk et al. | 74/467 |
| 4,603,865 | 8/1986 | Bien | 277/12 |
| 4,730,833 | 3/1988 | Foster et al. | 277/12 |
| 4,892,000 | 1/1990 | Renk et al. | 74/467 |
| 5,038,631 | 8/1991 | Renk et al. | 74/467 |
| 5,048,370 | 9/1991 | Duello | 74/606 R |
| 5,085,100 | 2/1992 | Duello | 74/606 R |

*Primary Examiner*—Thomas E. Denion
*Attorney, Agent, or Firm*—Richard J. Renk

[57] ABSTRACT

A gear case assembly and lubricant retaining device therefore wherein the assembly includes a gear case having a hub and/or shaft receiving opening therein and a lubricant retaining device extending toward the interior of said case to reduce lubricant flow through said opening. A part of said lubricant retaining device acts as a diverter to restrict lubricant flow toward said opening and consequential potential losses therethrough.

38 Claims, 4 Drawing Sheets

GEAR CASE

BACKGROUND OF INVENTION

1. Field of Invention

The present invention relates to the retaining of lubricant in gear cases and more particularly to the retaining of lubricant in traction motor gear cases such as found in diesel and electric locomotives and generally shown in U.S. Pat. No. 3,710,646.

2. Description of Related Art

Gear cases of this type include a pair of matable sections which can be nested about the propulsion gears and the axle and/or shafts used in the driving of locomotive wheels to provide an enclosure for the retention of lubricant.

Because of the critical nature of the gear case, it is important to retain the lubricant in the case and keep dirt, brake shoe dust, water and other contaminants out such as has been addressed in U.S. Pat. Nos. 4,347,759 and 4,470,324. Up to this time it has been difficult to retain thinner lubricants in the case because of the many variables involved such as extreme vibration and the lateral movement of the locomotive axle relative to the traction motor gear case. As a result, heavier lubricants using grease thickeners have been used to reduce lubricant losses.

However, there has been a need to utilize lighter viscosity lubricants and oils because heavy lubricants do not flow well and provide optimum gear coating in cold weather and, because of the desire of locomotive builders to utilize a common lubricant such as oils having a vicosity of ISO 460 centistokes for both the propulsion gears as well as traction motor armature bearings (instead of heavier oils for the gears such as ISO 3200 & 6800 centistokes).

SUMMARY OF INVENTION

The present invention provides an arrangement wherein thinner lubricants can be retained in gear case enclosures.

One aspect of the invention is to provide a new and improved gear case arrangement which restricts the outward losses of lighter viscosity lubricants in gear cases. The advantages of lighter lubricants are numerous such as the use of a common lubricant to lubricate dual components and thereby eliminate the need for different types of lubricants, the reduction of lubricant refill service time since lighter lubricants are easier to pump in cold climates, and the better lubricant coating of gears to reduce gear wear.

Another aspect of the invention is to provide a gear case arrangement which is not susceptible to plugging so as to become inoperable because of additives and foreign matter in the lubricant.

These advantages are accomplished by the present invention by the use of a device(s) which extends inwardly from a side(s) of the gear case and co-operates with portions associated with the gear case assembly such as the gear and/or axle shaft to provide a shielding relationship to reduce lubricant flow toward the outside of the gear case.

PREFERRED EMBODIMENTS

In the drawings the invention will be described with specific reference to locomotive traction motor gear case but it is of course not limited thereto.

Figure 1:
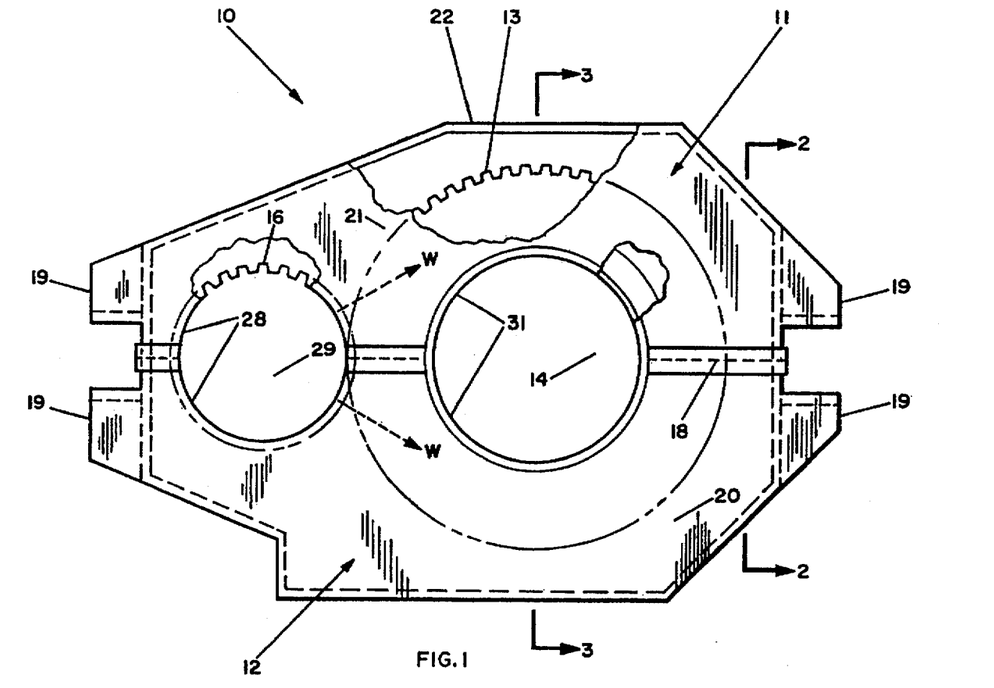
FIG. 1 is a side elevation of gear case with the concepts of the invention included therein.
Figure 2:
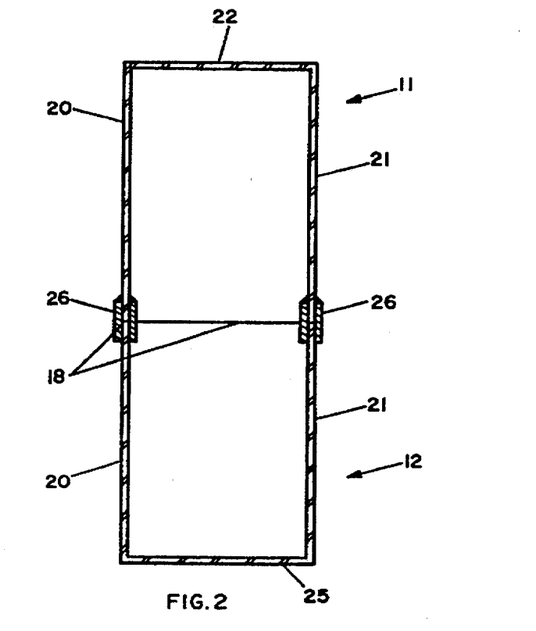
FIG. 2 is a sectional view of the gear case along lines 2—2 of FIG. 1 showing how a typical tongue and groove arrangement may be used along the mating split-line of the respective halves of the gear case.
Figure 3:
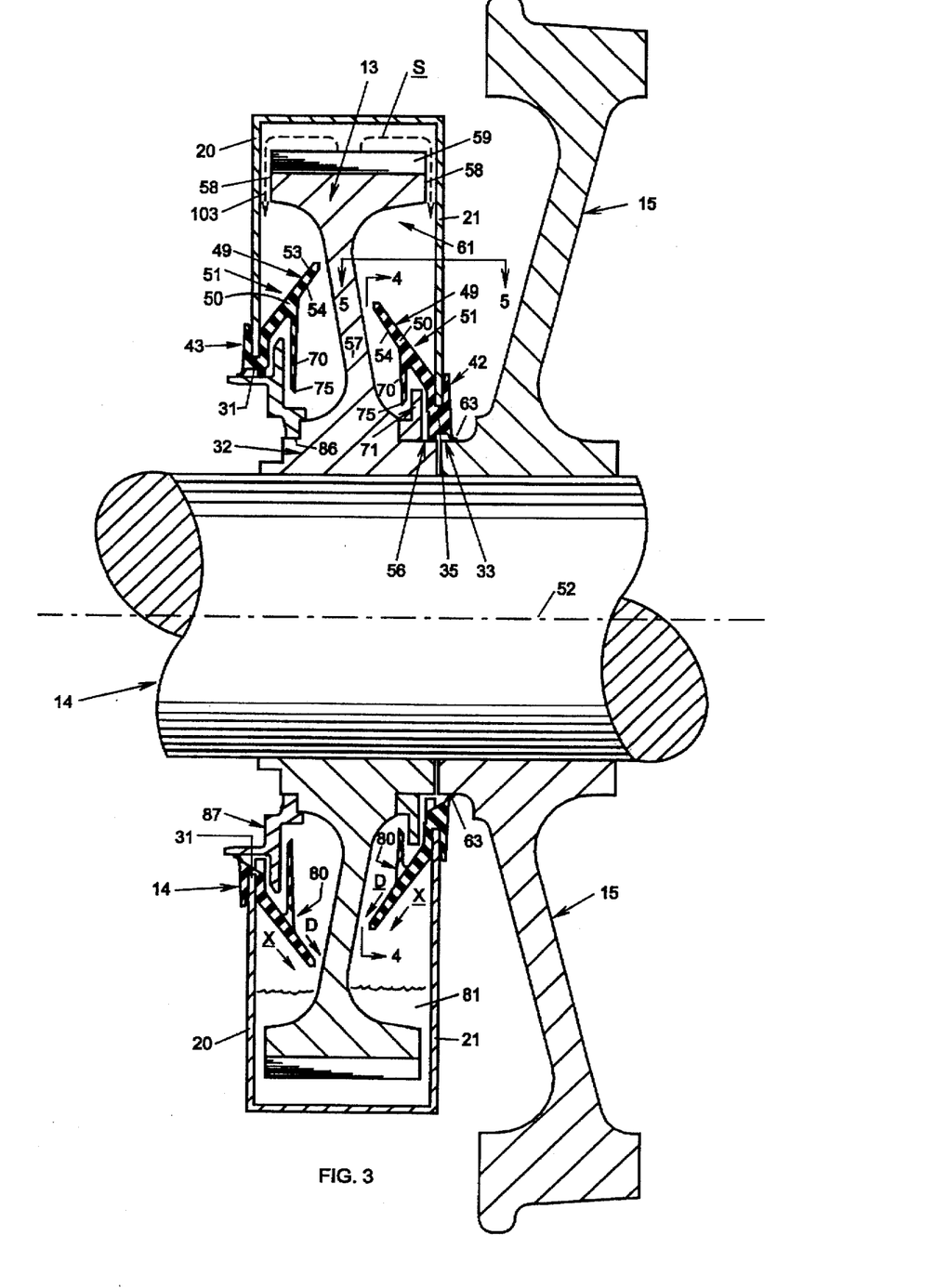
FIG. 3 is a vertical sectional view of the gear case assembly relative to a locomotive axle shaft, wheel, and bull gear, taken generally along lines 3—3 of FIG. 1

As shown in FIGS. 1–3, a typical gear case 10 comprises a pair of matable sections including an upper or top section 11 and a lower or bottom section 12 which encase movable parts such as a conventional bull gear 13 (carried by an axle or shaft 14) and a driving pinion gear 16 (FIG. 1). The gears drive wheel(s) 15 (FIG. 3).

The sections 11 and 12 are somewhat similar in shape and mate at a split-line indicated at 18 (FIGS. 1 & 2) to provide a unitary structure. Brackets 19 at their ends are used to clamp the sections 11 and 12 in mating relationship to supporting arms of a traction motor (not shown). As shown in FIG. 2, the upper gear case section 11 includes sides 20 and 21 and a top wall 22 having a series of angularly disposed areas. The lower gear case section has somewhat similar sides 20 and 21 and a bottom 25 with several angularly disposed areas.

The gear case sections 11 and 12 are kept in alignment with respect to one another along the split-line 18 by metal strips 26 welded along the top sides 20 and 21 adjacent the split-line to provide a groove. The strips 26 overhang the split-line 18 and help provide a tongue and groove area into which the split-line edge of the lower section 12 nests.

The gear case side wall 20 is provided with a semicircular cutout 28 (FIG. 1.) in both the top 11 and bottom 12 which align with one another to provide a circular passage or opening to the inside of the case through which a traction motor pinion drive shaft 29 may pass. The gear case sidewall 20 also has two larger semicircular cutouts or recesses 31 (FIG. 3) in the top and bottom halves 11 and 12 which align with one another to provide a circular passage or opening through which a surface such as a hub or somewhat circular or cylindical shaft-like surface may pass such as the axle 14 and/or gear hub 32 or wheel hub 33 (to be discussed later).

On the opposite or wheel side of the gear case (FIG. 3), there is generally only one circular cutout or passage 35 provided; this is formed by two semicircular cutouts or opening in the side wall 21 of the respective gear case halves 11 and 12. The passage 35 allows a somewhat circular surface such as the wheel hub 33 or gear hub 32 to extend through the passage.

The various circular cutouts or passages 31 and 35 provide communication between the inside and the outside of the case through which movable members such as those having shaft-like surfaces or areas may extend such as the axle 14 gear hub 32 and the wheel hub 33. It is through these cutouts or openings that lubricant may leak from the case and dirt and water may enter the case. As will be used herein a reference to "inwardly" and "outwardly" of the case is made in relation to the inside of the gear case, i.e. "inwardly" means toward the interior of the case and the gear 13 and "outwardly" toward the outside or exterior thereof.

Detailed reference is now made to FIG. 3 which shows a cross section through the gear case showing its relationship to the locomotive bull gear 13, axle 14, and wheel 15. The traction motor (not shown) drives the pinion gear 16 (FIG. 1) which in turn drives the bull gear 13 and consequently the axle 14 and wheels 15. The gear case 10 is fixed with respect to the traction motor (not shown) through the brackets 19.

Because of the bull gear's large diameter (in many cases exceeding 34") the gear lubricant is subjected to severe turbulence and pressurized spraying because of the surface speed of the gear teeth, even at lower speeds. Pressurized lubricant flow is generated at the mesh area between the bull gear 13 and pinion gear 16 as shown by the arrows "W" in FIG. 1. In addition, very heavy lubricant splash is generated toward the top walls 22 etc. as shown at "S" in FIG. 3. As a result, with a locomotive traveling 12,000 to 30,000 miles per month, the lubricant losses with lighter viscosity lubricants can be quite high and require numerous time consuming and costly refilling stops.

Figures 4, 5:
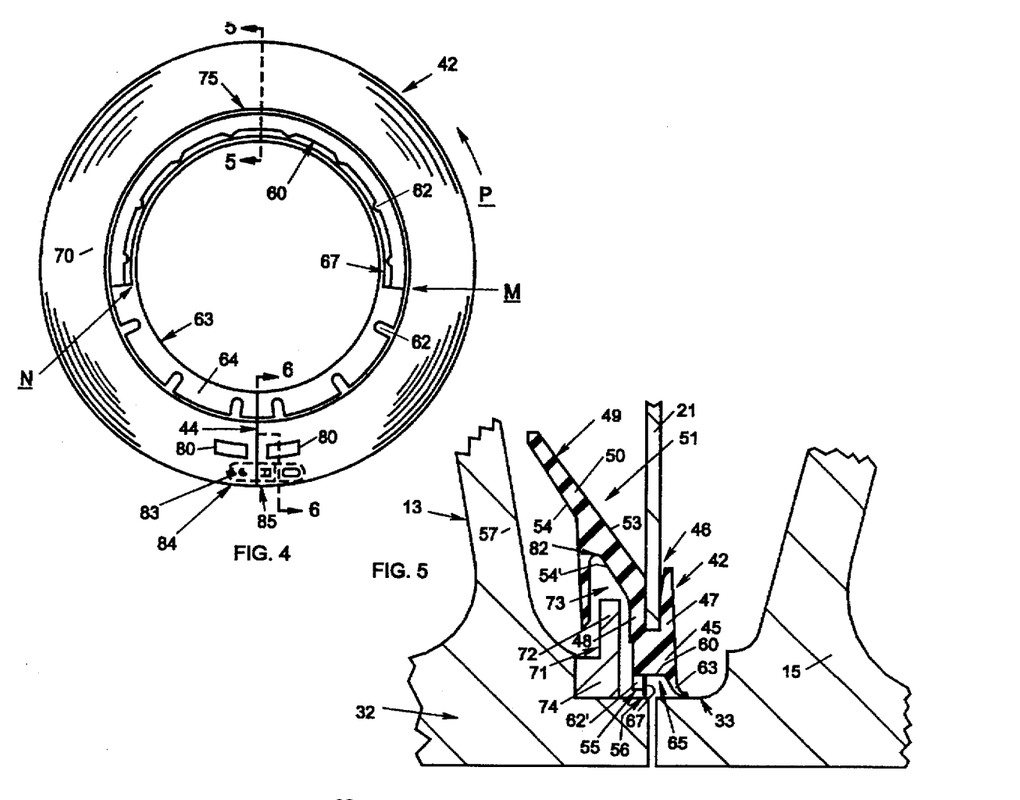
FIG. 4 is a side elevation of a typical wheel or outboard side lubricant retaining device as viewed from the inside of the gear case along lines 4—4 of FIG. 3.
FIG. 5 is a sectional view of the wheel side lubricant retaining device taken along lines 5—5 of FIG. 3 generally at the 12:00 o'clock position of the device showing the device in relation to fragmentary parts of the wheel, gear and gear case assembly.

Now, in accordance with the present invention, to reduce lubricant losses from the gear case (and prevent water and dirt entry into the gear case) there are provided sealing means or lubricant retaining devices 42 on the wheel side (and 43 on the motor side). As shown in FIGS. 3 and 4, the sealing devices 42 and 43, which may be molded from a resilient material such an elastomeric material, may be circular or annular in shape and formed as one piece with a split-line 44 (FIG. 4).

Generally, the sealing elements 42 and 43 have a circumferentially or arcuately extending base generally indicated at 45 (FIGS. 5–7) with a circumferentially extending annular slot 46 opening radially outwardly from the base and defined between circumferentially extending outer legs 47 and inner legs 48. The slot 46 in the respective sealing elements or members is made to receive the cutouts 31 and 35 of the gear case sides in tongue and groove fashion as will be described in detail later.

Extending inwardly from the sealing element base 45 toward the inside of the gear case is an arcuately or circumferentially oriented lubricant collecting means or section 49. The collecting means 49 may include a web or leaf section 50 (FIGS. 5–9) extending inwardly from the inner leg 48 or base 45 toward the inside of the gear case. The web or leaf 50 may be in a generally arcuately or circumferentially oriented truncated conical form. The web or leaf extends generally at an angle to the axial centerline or rotational axis 52 of axle 10 (FIG. 3) and gear case side walls 20–21 to provide a V-shaped trough or channel 51. (As used herein "radially inwardly" extends toward the rotational axis 52 and "radially outwardly" extends away from such axis.)

The web 50 may be relatively thin and pliant with the V-shaped trough or channel 51 (FIG. 3) facing toward the top and bottom gear case walls 22 and 25. In effect, the web or leaf 50 diverges radially away or outwardly from the horizontally disposed axial centerline 52 as it extends inwardly into the case and away from the gear case sides etc. In other words, the web 50 has a somewhat frustro-conical shape, spreading wider or enlarging as it progresses away from the gear case sides with its inner or underside 54, 54' wall or surface (FIG. 3) facing somewhat toward the axial centerline 52 and toward the gear and its outer or upper side 53 facing away from the centerline and toward the gear case side walls 20, 21. As it extends inwardly, the web 50 may extend inwardly toward the gear arm 57 and under the projection of the sides of the gear rim 58 and gear teeth 59 and into the undercut area 61 (FIG. 3) for a purpose to be described later.

Reference is now made to the wheel-side sealing device 42 (FIGS. 3, & 5–7). For purposes of sealing against the cylindrical wheel hub surface 33 there is provided an outer lip 63 extending radially inwardly toward the rotational axis 52 and angularly outwardly toward the outside of the case from the base 45 and away from the outer leg 47. Lip 63 is formed to have a slightly smaller diameter than the wheel hub surface 33 so as to compressively engage and seal against the hub.

As may be seen in FIG. 3, the wheel hub surface 33 is circular or shaft-like and extends axially inwardly through the inner diameter (I.D.) of seal member 42 and toward the interior of the gear case where it is in close proximity to the gear hub 56 (wheel side) of somewhat similar circular shape. To allow the gear case sides 21 to overhang the wheel and gear hub surfaces 33 and 56, the sealing device base 45 has its inner diameter (I.D.) along its approximate upper half generally indicated at 60 (FIG. 5) and lower approximate half indicated by surface 64 (FIG. 6) spaced as at 65 from the hub surfaces 33 and 56. That is, the surfaces 60 and 64 have a larger I.D. than the wheel hub 33 and gear hub 56.

Figure 6:
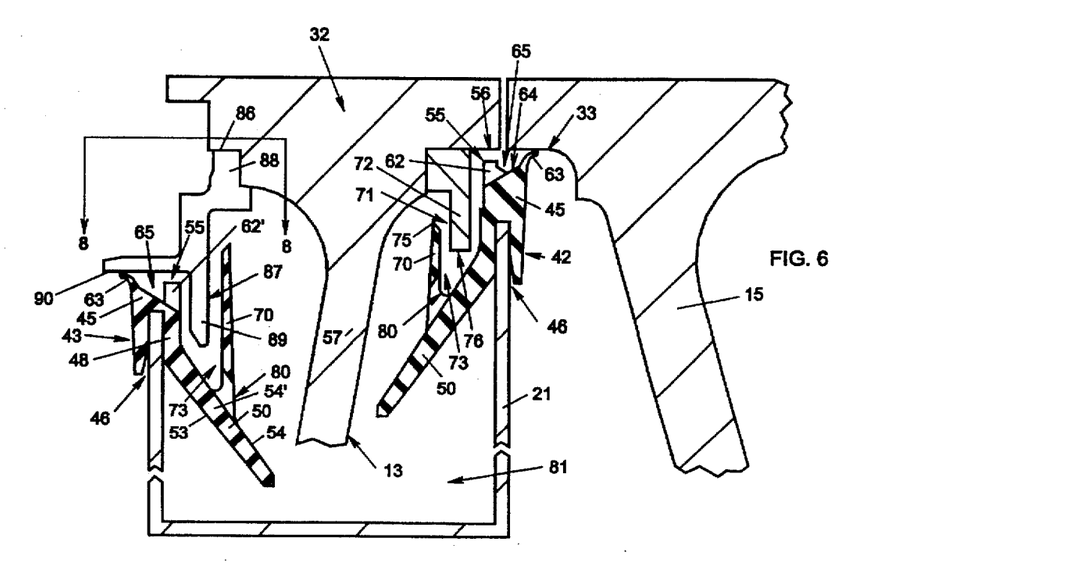
FIG. 6 is a sectional view of the wheel side and motor side lubricant retaining devices at the 6:00 o'clock position of the devices along a gear case section in the position of lines 6—6 of FIG. 4 with fragmentary parts oft he gear case assembly shown.

To keep the base surfaces 60 and 64 away from the hubs 33 and 56, particularly during assembly of the gear case when the sides 20 and 21 enter the sealing device's slot 46, there are provided spacer means in the form of projections or protrusions 62 and 62' (FIGS. 5 & 6) which extend radially inwardly from the base surfaces 60 and 64 toward the hubs. As shown in FIG. 4, the projections are spaced apart circumferentially and may take the shape of small semicircles to provide minimal contact should any of them touch the hub surfaces 33, 56. Normally, it is desirable to have the projections 62-62' spaced from the hub surfaces 33 and 56 as shown at 55 in FIGS. 5 and 6 and somewhat in line with the sealing device slot 46 for the gear case sides. In FIGS. 5 and 6 the spacers overhang the gear hub 56 but could overhang the wheel hub 33 in another type of installation.

As will be described in greater detail later, if the gear case side sheets 20 and 21 meet any frictional resistance when being nested in the slots 46, the sealing device may be deflected slightly toward a hub and the projections 62-62' will tangentially bottom or contact a hub such as 56 thereby stopping the deflection and providing a firm base to force the sealing device slots 46 into full nesting engagement with the side sheets 20 and 21. At the same time, the projections 62-62' will keep the sealing device's bottom base surfaces 60 and 64 spaced substantially as shown at 65.

Figure 7:
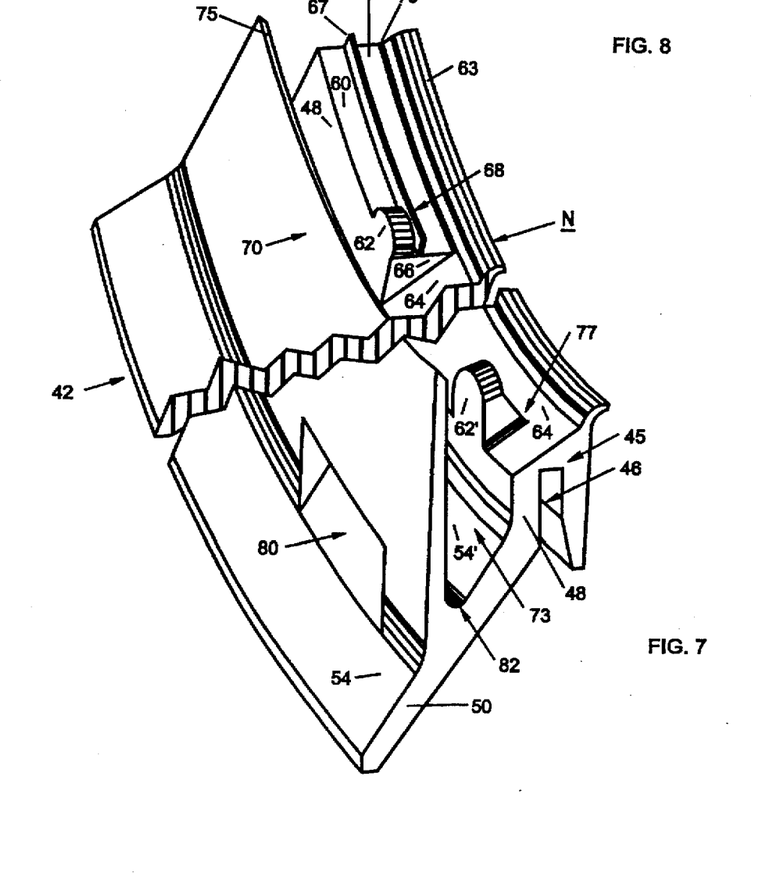
FIG. 7 is a partial perspective view of the device looking clockwise in FIG. 4 from the 6:00 o'clock split-line of the device past the 9:00 o'clock position thereof.
Figure 8:
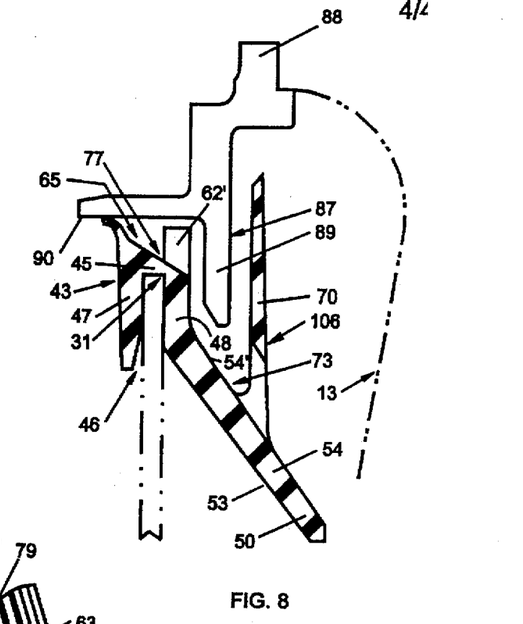
FIG. 8 is an enlarged fragmentary sectional view of the motor or inboard side retaining device taken generally between the 3:00 and 6:00 o'clock positions along lines 8—8 of FIG. 6 and between spacer projections thereof.

As may be viewed in FIGS. 4–7, the I.D. surface 60 of the base 45 may extend approximately 180° around the top half of the sealing device, i.e. from point "M" (FIG. 4) at approximately the 3:00 o'clock position in the direction "P" (through the 12:00 o'clock position) to point "N" at about the 9:00 o'clock position. The surface 60 is somewhat flat or semi-cylindrical and generally extends axially (and somewhat parallel to the axle 14 and rotational axis 52) to where it meets the outer lip 63 at its base 79 (FIG. 7). The outer lip 63 then tapers radially inwardly and axially outwardly away from the gear case side 21 to engage the wheel hub 33.

As a further restriction against turbulent lubricant splash toward the outside of the gear case and toward the outer lip 63, there is provided a barrier means 67 (FIGS. 5 & 7) along the upper part of the device in the form of a thin membrane splash lip or dam which bridges between the back or outward facing sides of the spacers 62. The splash lip 67 extends generally along the I.D. surface 60-60' from point "M" to point "P" of the base 45 around the upper part of the sealing device in the direction indicated by the arrow "P" or in other words partially around the base 45 and preferably from approximately the 3:00 o'clock to 9:00 o'clock positions. Lip 67 is thus on the axially outward side of the spacers 62 and also extends radially inwardly toward the gear hub surface 56 (FIG. 5) so as to be in close proximity to the hub. Preferably the splash lip 67 makes very light contact with the hub 56 so as not to generate excessive frictional heat. In the embodiment shown, the splash lip 67 is somewhat centered along the axial width of the I.D. surface 60-60' (FIG. 7) although this may be varied depending on the application. As may be seen in FIG. 7, the lip 67 extends radially inwardly slightly farther than the spacers 62 as indicated at 68; in other words, the lip extends slightly beyond the spacers. This is desirable since the spacer 62 is only used to prevent excessive deflection of the sealing device during assembly.

On the bottom part of the sealing device 42, the base 45 has its I.D. surface 64 (FIGS. 6 & 7) tapered or pitched from the outer lip 63 radially outwardly and inwardly toward the inside of the gear case 11 (and toward the gear 13). This taper allows lubricant which gets to the surfaces 64 to drain downwardly and away from the outer lip 63 toward the bottom inside of the case. In other words, lubricant which passes the splash lip 67 on the upper half of the device can run along the outboard side 60' of the base I.D. surface (FIG. 7) toward the 3:00 and 9:00 o'clock positions "M" and "N". Lubricant can then drain downwardly over the side wall 66 at the juncture of the upper base surface 60-60' and the lower tapered or pitched drain surface 64.

As shown in FIG. 7, to help in providing lubricant drainage away from the outer lip 63 and along the lower half of the sealing device, the tapered surface 64 meets the lower spacers 62' projecting therefrom at a sharp acute angle as indicated at 77. Such point is radially outward or at a larger diameter than the juncture 79 of outer lip 63 with the upper end of tapered surface 64. This helps prevent lubricant from collecting behind the spacers 62'; and, since the junction 77 of the lower spacers 62' is lower (in the lower half of the sealing device) than the outer lip 63, drainage is facilitated. The taper also helps to prevent bridging of lubricant between the hubs 33, 56 etc. and the sealing devices inner diameter 60, 64 which can result in lubricant losses past the outer lip 63.

As another aspect of the invention, to retain the newer lighter viscosity lubricants (such as Mobil Synthetic Oil "SHC 460") which can be 7 to 14 times lighter than those used in the past for traction motor gearing and therefore more susceptible to greater turbulence and splash, the sealing devices 42, 43 have a diverter means in the nature of shroud or skirt means indicated generally at 70 (FIGS. 5–7). The diverter 70 extends radially inwardly from the underside 54-54' of the sealing devices web or leaf 50 toward the axle centerline 52 and the various hubs 32, 33 etc. and acts as a first barrier to the flow or splashing of lubricant toward the gear case opening 35 after it has passed collecting means 49. The diverter 70 may be positioned axially inwardly toward the gear arm 57 from a projection means 71. In these embodiments the projection means 71 is preferably in the form of an impeller or ringer means rotatable with the gear 13 and axle 14. The projection means 71 is located axially outwardly (toward outside of the gear case) from the diverter 70, i.e. between the diverter 70 and the sealing device inner leg 48.

As may be viewed in FIG. 5, the impeller means 71 may be in the form of a ring having rim 74 carried on the gear hub 32 and a finger or extension portion 72 extending radially outwardly toward the underside 54-54' of the sealing device 42. The finger 72 extends into a pocket or channel 73 formed between the inner leg 48 of the sealing device 42, the underside 54' of the web 50, and the diverter 70. Pocket 73 in effect thus straddles the projection means 71. Preferably the diverter 70 has its I.D. tip or free end 75 (FIG. 6) extending past the O.D. 76 of the projection means finger 72. In other words the I.D. 75 of the diverter's tip 70 is less than the O.D. 76 of the finger 72 and as such they overlap one another. The projection means finger 72 thus acts as a second barrier to the flow or splashing of lubricant toward the outside of the gear case through the gear case opening 35 after it has passed the collecting means 49.

Any lubricant which collects in the sealing device pocket 73 runs toward the bottom or 6:00 o'clock position of the device or toward the split line 44 (FIG. 4) and thence through drain ports 80 (FIGS. 4 & 7) which extend through the diverter wall 70 adjacent the 6:00 o'clock position. Lubricant passing through the ports is thus able to flow back into the gear case bottom reservoir 81 (FIG. 3). As a further aid to retaining lubricant, when the projection means 71 rotates it acts as an impeller or ringer member. Lubricant is thrown by the impeller toward the V-tip vertex or bottom 82 of the pocket 73 which acts as a trough to drain the lubricant to the drain ports 80 and thence back into the gear case reservoir. Bottom 82 of pocket 73 is radially outwardly of the diverter's innermost top or free end 75. For draining purposes, in some instances the split ends of the skirt 70 may stop slightly short of meeting at the split-line 44 to provide a small gap (not shown) for drainage. However, a continuous skirt as shown has been found to work very well.

For purposes of installing the sealing devices 42, 43 around the hubs 32, 33 etc. the sealing devices maybe sprung open at the split line 44 (FIG. 4). Once installed the devices are held in place by a latch 83 which holds the split ends 84 and 85 of the sealing elements together. Installation of the gear case relative to the sealing devices is discussed in detail in U.S. Pat. No. 4,347,759. If needed, in some cases the diverter means or skirt 70 may have one or more thin radial slits (not shown) to enable it to be sprung open and be inserted over the projection finger 72 and which close after installation.

Reference is now made to the motor side sealing device 43 (FIGS. 3, 6 & 8) which is very similar to the wheel side sealing device 42 but larger in diameter to accommodate a different projection means 87. Parts similar to the wheel side device 42 are designated by like numerals.

The motor side projection means 87 includes a mounting rim 88 secured to the gear hub's (32) motor side surface 86, a finger 89 extending radially outwardly away from the rotational axis 52 into a pocket 73 of sealing device 43, and a cylindrical rotational hub surface 90 extending axially through the gear case opening 31 (FIG. 3) in side wall 20. The sealing device spacers 62' (FIG. 8) along the bottom half of the sealing device may have a slightly narrower base but still meet the spacer 62' at a sharp angle as at 77 for good lubricant drainage back to the reservoir 81.

Figure 9:
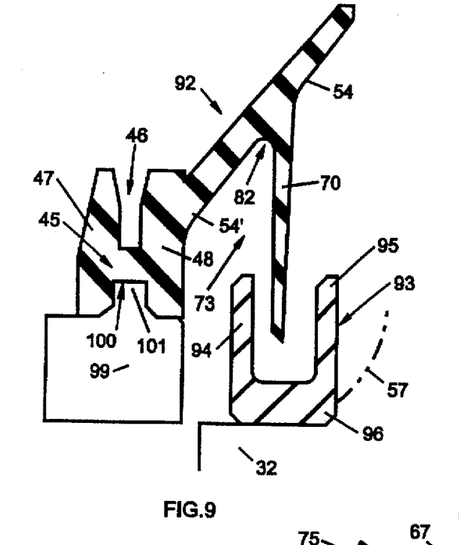
FIG. 9 is a sectional view of an alternate embodiment of a lubricant retaining device and assembly.

An alternate embodiment of the invention is shown in FIG. 9. In this embodiment the sealing device is indicated at 92 and the projection means indicated at 93 is somewhat U-shaped and includes multiple projections or fingers 94 and 95 which extend radially outwardly away from a base 96 secured to gear hub 32. The fingers are on opposite sides of the sealing device's diverter means 70. Finger 94 projects into the sealing device pocket 73 and finger 95 is axially inwardly and between the diverter means 70 and the gear arm 57. Thus the fingers 94 and 95 straddle or are on opposite sides of the diverter means 70. The fingers 94 and 95 in some cases may be of different heights or radial lengths.

The alternate sealing device 92 also differs in that seals against a stationary surface or hub 99 instead of using a lip 63 against a rotating hub. Specifically, the sealing device 92 has outer and inner legs 47 and 48 which define an annular slot 46 into which a gear case side such as 20 is inserted. Base 45 of the device has a circumferential groove 100 which seals against a complementary circumferential tongue 101 of the hub 99.

Now, to summerize the operation of the invention, as the bull gear 13 rotates, lubricant from the bottom reservoir 81 (FIG. 3) is carried upwardly by the gear 13 and is sprayed against the gear case top wall 22 as indicated at "S". As shown by the arrows 103, the lubricant is then deflected downwardly along the gear rim sides 58 and the gear case sides 20 and 21. Lubricant traveling along the rim and gear case sides in the general direction of the arrows 103 is then collected in the sealing device trough or channel 51; it then flows downwardly following the arcuate shape of the trough and drains as by the arrows "X" (FIG. 3) to the bottom of the reservoir area 81.

As noted hereinbefore and as shown in FIG. 3, the sealing devices leaf 50 can extend axially inwardly to project under the sides of the gear rim 58 as shown at 61. Any lubricant dripping directly down from the rim sides is then caught by the web leaf 50.

Lubricant splatter which gathers on the web's underside or inner wall 54 can also drain to the lowermost point of the sealing devices because of the truncated taper or pitch of the inner wall. As will be seen in the lower portion of FIG. 3, lubricant will drain off of the sealing device inner wall 54 as shown by the arrow "D". Any lubricant which passes the diverter 70 may then be flung under centrifugal force by the projection mean's finger 72 into pocket 73 and then pass through the drain ports 80 to the reservoir 81.

With the alternate embodiment shown in FIG. 9, an additional third barrier is provided by the U-shaped projection means 93. Lubricant moving along the gear arm 57 or skin 70 toward a hub may be initially intercepted by the inner or inboard projection means finger 95 and then by the diverter 70. Any lubricant which then passes the diverter 70 can then be intercepted by the outboard finger 94 and thence into the pocket 73.

Also, while the gear and wheel hubs have been shown and referred to as shaft areas, there may be other members or devices associated with the gear case and/or gearing includable in this terminology. Likewise, while the wheel hub, gear hub and axle are different components, they do, of course, have association with one another in the gear case assembly.

What we claim is:

1. A lubricant retaining device for a gear case having a series of sides adapted to contain a lubricant, said case being adapted to enclose a gear which gives off a lubricant spray pattern when rotating about a rotational axis with at least one of said gear case sides having a receiving opening therein, and wherein said gear has a tooth area along a surface thereof, said device comprising,
    a collector adapted to extend inwardly from a point adjacent a side of said case toward said gear and in overhanging relation with respect to said rotational axis to collect lubricant spray from said gear directed toward said rotational axis,
    said collector having a wall extending in an axial direction toward said gear and overhanging and facing at least portion of said rotational axis as it projects inwardly from a point adjacent a side of said case toward said gear,
    diverter means extending from said collector toward said rotational axis to divert lubricant which may pass said collector away from said receiving opening, and
    locating means carried by said device for positioning said device relative to said case.

2. A device as claimed in claim 1 wherein said diverter means extends radially inwardly toward said rotational axis.

3. A device as claimed in claim 1 wherein said diverter means is positioned between said gear and a gear case side.

4. A device as claimed in claim 1 wherein said diverter means extends arcuately to divert lubricant away from said receiving opening.

5. A device as claimed in claim 1 wherein said diverter means extends substantially around the retaining device.

6. A device as claimed in any of claims 1, 2, 3, 4 or 5 wherein drain means is provided for draining any lubricant back into said gear case which may collect between said diverter means and said collector.

7. A device as claimed in claim 6 wherein said drain means is generally located along the lower part of said device.

8. A device as claimed in claim 1 wherein a projection means is positioned within said case and extends toward said device.

9. A device as claimed in claim 1 wherein a projection means is postioned within said case and extends toward said device, and wherein said device's diverter means is positioned inwardly toward said gear from said projection means.

10. A device as claimed in claim 8 wherein said diverter means extends radially inwardly toward said rotational axis and said projection means extends radially outwardly away from said rotational axis.

11. A device as claimed in claim 8 wherein said diverter means and said projection means have portions thereof which overlap one another.

12. A device as claimed in any of claims 8, 9, 10 or 11 wherein said projection means is rotatable with said gear about said rotational axis.

13. A device as claimed in claim 8 wherein multiple projection means are provided and said diverter means is positioned axially between said projection means.

14. A device as claimed in claim 13 wherein said multiple projection means is somewhat U-shaped.

15. A device as claimed in claims 13 wherein said multiple projection means are of different radial lengths.

16. A device as claimed in claim 1 wherein said diverter means has a free end and extends at an angle to said collector to provide a pocket between said collector and said diverter means.

17. A device as claimed in claim 16 wherein the bottom of said pocket is radially outwardly from said free end of said diverter means.

18. A device as claimed in claims 16 or 17 wherein said pocket straddles said projection means.

19. A device as claimed in claim 18 wherein a drain means is provided in said diverter means to allow lubricant to drain out of said pocket.

20. A device as claimed in claims 16 or 17 wherein a plurality of drain means are provided in said diverter means.

21. A device as claimed in claim 1 wherein said device has an arcuately extending base adapted to be radially spaced from a hub surface and wherein a splash lip extends radially inwardly from said base toward said hub surface.

22. A device as claimed in claim 21 wherein said splash lip extends partially around said base.

23. A device as claimed in claim 22 wherein said splash lip extends generally around the upper portion of said device.

24. A device as claimed in claim 1 wherein said device has an arcuately extending base adapted to be spaced from a hub surface, said base having a portion of a surface thereof facing said hub surface and tapering inwardly toward said gear and radially outwardly away from said rotational axis.

25. A device as claimed in claim 24 wherein said tapered surface extends along a lower portion of said base.

26. A device as claimed in claim 24 wherein said base has a series of spacers arcuately separated from one another projecting radially inwardly from said tapered surface and meeting said tapered surface at an angle.

27. A device as claimed in claim 21 in which said base has a portion of a surface thereof facing radially inwardly toward said hub surface and extending somewhat parallel to said axis of rotation and wherein a series of spacers project radially inwardly from said hub surface, and wherein said splash lip extends between said spacers.

28. A device as claimed in claim 21 wherein said base has spacers and said splash lip extends radially inwardly farther than said spacers.

29. A device as claimed in claim 1 wherein said device has a sealing lip extending therefrom, said lip being positioned axially outwardly from said diverter means and being adapted to engage a hub surface extending in proximity to said receiving opening.

30. A device as claimed in claim 1 wherein said locating means has means for engaging and registering with a static hub surface and means for engaging and registering with a portion of said gear case.

31. A device as claimed in claim 30 wherein said locating means for engaging a static hub includes a groove opening radially inwardly toward said static hub surface which is mates with a complimentary portion on said hub.

32. A device as claimed in claim 9 wherein said projection means extends into a pocket formed between said collector and said diverter means and is rotatable therein.

33. A device as claimed in claim 1 wherein a hub surface is exposed to the inside of said gear case and extends in proximity to said receiving opening and wherein said collector extends in overhanging relation with respect to at least a portion of said hub surface to collect lubricant spray directed toward said surface.

34. A device for a traction motor gear case wherein the case has a series of walls adapted to contain a lubricant and wherein a gear in said case is mounted on a shaft rotatable about rotational axis and gives off a lubricant spray pattern when rotating, and wherein said case includes a plurality of sections which abut one another at a split-line to provide an enclosure about said gear, said sections having a complimentary pair of side walls with aligned oppositely facing recesses along adjacent edges which form an opening when said sections are assembled together, and wherein an impeller having a portion which extends radially away from said rotational axis is also located in said gear case and is rotatable with said shaft, said device comprising, an arcuately extending base having locating means for positioning said device relative to said case, an arcuately extending collector projecting axially inwardly from said base toward said gear and the inside of said case, said collector being spaced radially outwardly from said rotational axis and having a wall surface facing toward said rotational axis as said collector extends toward said gear, said collector providing an overhanging area to collect lubricant spray from said gear directed toward said rotational axis, a skirt for diverting lubricant away from said gear case opening extending radially inwardly from said device toward said rotational axis, said skirt and at least a portion of said collector's wall surface forming a pocket into which said impeller is able to extend, said skirt being spaced axially inwardly toward said gear from said impeller and having drain means for allowing any lubricant which collects in said pocket to drain therefrom.

35. A device as claimed in claim 32 wherein said skirt has a free end extending in an arcuate direction.

36. A device as claimed in claim 35 wherein said skirt has a radially extending slit therein.

37. A device for a gear case having a series of sides adapted to contain a lubricant, said case having an opening in a side thereof through which a shaft is adapted to extend, said shaft having a gear mounted thereon and having its rotational axis disposed generally horizontally with said shaft, and wherein a projection means is positioned within said case between said gear case side and said gear and extends radially away from said axis of rotation, said device including, collecting means including a web which is adapted to extend in a generally circumferential direction in generally overhanging relation to said shaft and to be spaced therefrom, said collecting means extending in an axial direction toward the inside of said gear case and toward said gear and having a side which faces toward said rotational axis and said shaft as it extends inwardly toward the inside of said case and away from a side of said gear case, said collecting means including a pair of ends to enable said device to be inserted in overhanging relation with respect to said shaft without removing said gear from said shaft, a skirt extending inwardly from said collecting means toward said rotational axis, said skirt being spaced from said projection means but overlapping a part of said projection means in a radial direction and, locating means carried by said device for positioning said device with said gear case in proximity to said opening therein and generally spaced away from said shaft, said means including a groove defined between spaced apart leg members and shaped to receive and nest with a complimentary portion carried by a gear case side to locate said device relative to said case.

38. A traction motor gear case assembly comprising, a gear case having a series of walls adapted to contain a lubricant, said case including a plurality of sections having a complimentary pair of side walls with aligned oppositely facing recesses along adjacent edges which form an opening when said sections are assembled together, a shaft extending into said opening and being rotatable about a rotational axis, a gear in said case mounted for rotation about said rotational axis with said shaft which gives off a lubricant spray pattern when rotating, an impeller within said gear case rotatable with said gear, said impeller having a surface projecting radially outwardly away from said rotational axis, a lubricant retaining device having locating means for positioning it with reference to a wall said gear case, said lubricant retaining device having a collector projecting axially inwardly toward the inside of said case and said gear, said collector being spaced radially outwardly from said rotational axis and extending in an axial direction toward said gear, and a skirt extending inwardly from said collector toward said rotational axis, said skirt being spaced from said impeller and being closer to said gear than said impeller.

* * * * *